July 15, 1947.　　　　　C. OTTO　　　　　2,424,207
PRODUCTION OF AMMONIUM SULPHATE
Filed May 30, 1944
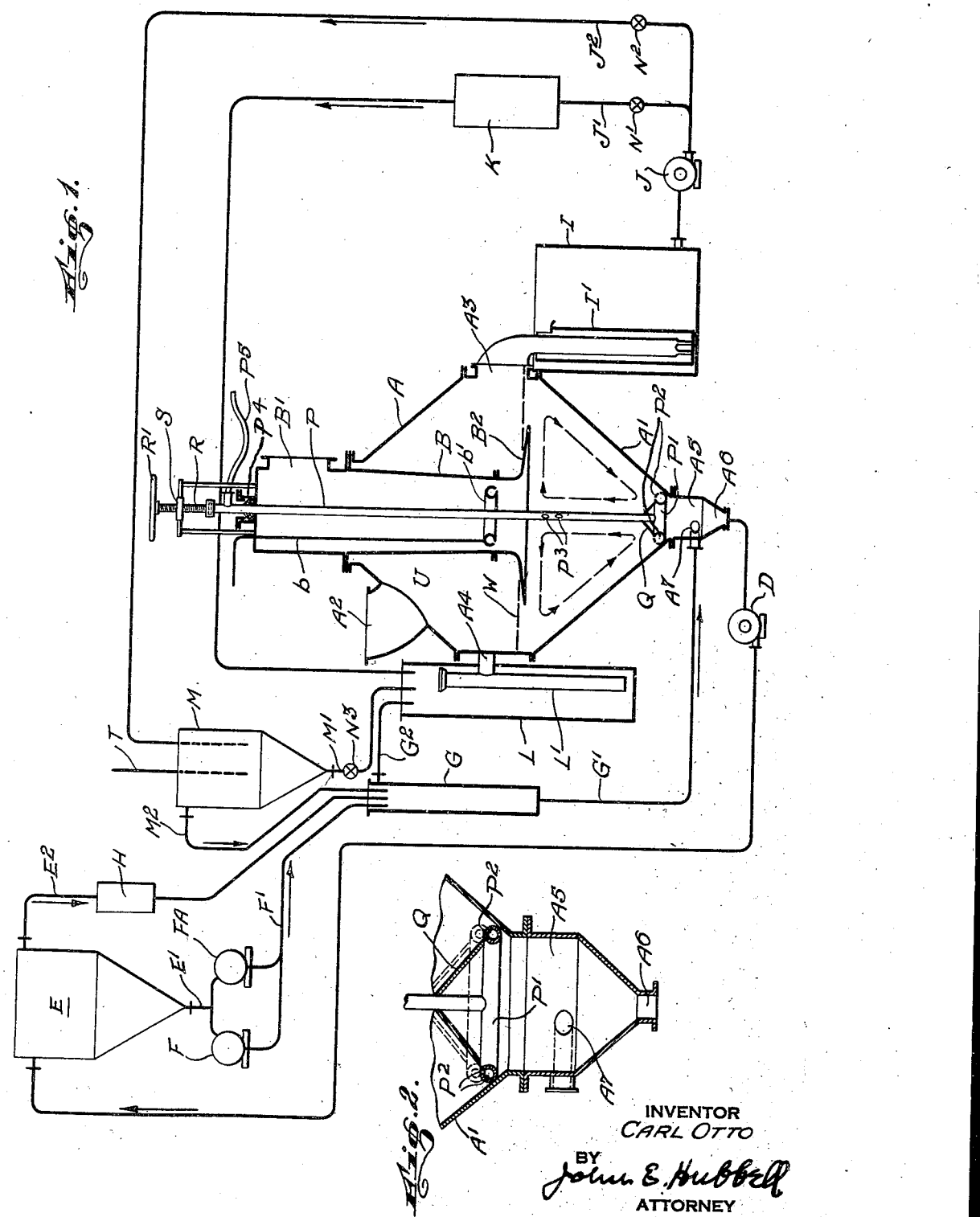
INVENTOR
CARL OTTO
BY
John E. Hubbell
ATTORNEY Patented July 15, 1947

2,424,207

UNITED STATES PATENT OFFICE 2,424,207

PRODUCTION OF AMMONIUM SULPHATE

Carl Otto, Manhasset, N. Y.

Application May 30, 1944, Serial No. 538,100

9 Claims. (Cl. 23—119)

The general object of the present invention is to provide an improved method of and improved apparatus for converting the ammonia content of distillation gas in sulphate of ammonia in a socalled saturator containing a bath of weak sulphuric acid with which the gas is brought into scrubbing contact so that the ammonia elements in the gas and the sulphuric acid elements in the bath combine to form sulphate of ammonia which subsequently crystallizes out of the solution.

The invention relates particularly to the construction and operation of a saturator adapted for use and used in the production of relatively large sulphate crystals. Heretofore, very little of the substantial amount of sulphate of ammonia produced in this country by passing coke oven gas through saturators has been in the form of large crystals. However, the term "large," as used herein, is well established in the art and indicates crystals of an average size and weight several times that of the finer crystals heretofore customarily produced. For example, the term "Grade A" ammonium sulphate crystals is a well known term of art applying to sulphate comprising crystals of which 40% are too large to pass a 35 mesh screen and only 5% are small enough to pass through an 80 mesh screen, whereas of the fine sulphate of ammonium crystals commonly produced in saturators, 80% or more will pass through a 35 mesh screen and about 20% or more will pass through an 80 mesh screen.

In the production of sulphate of ammonia in the general manner described, the crystals formed are initially minute and become large crystals only as a result of crystal growth requiring movement of the crystals relative to the "mother liquor" or bath liquor out of which the fine crystals crystallize and in which they grow. A small sulphate of ammonia crystal increases in size, or grows, because it forms a nucleus for the attachment of other sulphate of ammonia crystallizing out of the bath liquor. For such growth it is practically essential that the bath liquor be subjected to agitation or recirculation so that each small crystal may be continuously moving out of immediate contact with bath liquor which lacks, and be moving into immediate contact with bath liquor which does not lack sulphate of ammonia available for immediate attachment to the growing crystal.

For the desired crystal growth necessary for the production of large sulphate of ammonia crystals, it is also practically essential that the acidity of the bath liquor should be lower than is necessary or customary in the production of fine crystals. Thus, for example, the acidity of the bath liquor commonly employed in the production of fine crystals is that corresponding to a bath liquor sulphuric acid content of 7 per cent or higher, whereas the acidity of the bath liquor employed in the production of large crystals may well be that corresponding to a bath liquor acid content of 5.5 per cent or lower.

The low acidity of the bath liquor tends to troublesome deposits of sulphate of ammonia, commonly called "rock salt," on exposed saturator surfaces and within the bath, and the maintenance of conditions tending to minimize "rock salt" deposits is practically important in the production of large sulphate of ammonia crystals. The relatively low acidity required for the production of large sulphate of ammonia crystals also increases the extent, and/or effectiveness of the scrubbing contact of the ammonia containing gas and bath liquor required to recover all the ammonia content of the gas.

The production of large sulphate of ammonia crystals in the manner contemplated herein is a continuous process and the bath liquor normally contains crystals which are in all stages of growth and size. The larger crystals tend to collect in the lower portion of the usual hopper bottom of the saturator, and in the arrangements shown, are withdrawn from the saturator in a carrying stream of bath liquor by a pump which may be a centrifugal pump or a jet pump, and in either case has its inlet open to the saturator at or adjacent the lower end of the latter.

In my prior applications Serial No. 473,950, filed January 29, 1943; Serial No. 492,265, filed June 25, 1943; and Serial No. 525,544, filed March 8, 1944, I have disclosed novel forms of apparatus for use in the practice of a novel method of producing sulphate of ammonia crystals, and particularly crystals of relatively large size, characterized by the maintenance of a bath liquor zone which I call a separation zone, at the bottom of the saturator bath, in which the small crystal content of the bath liquor is smaller than in the body of the bath. In the practice of that method, relatively large crystals produced in the body of the bath external to said zone, settle into the latter and are moved out of the saturator in a carrying stream of bath liquor withdrawn from a lower portion of said zone. In the practice of said method, the amount of small crystals in the separation zone is kept relatively small, in part by the maintenance of flow conditions in the bath which tend to minimize the movement of small crystals into the separation zone from the portion of the bath external to said zone, and in part by the return to said zone of bath liquor previously withdrawn from the saturator and treated to reduce its crystal content.

A primary object of the present invention is to improve the above mentioned method by variably restricting the down movement of crystals into a lower, crystal exit portion of the separation zone without necessarily interrupting the withdrawal of carrying liquor from, and the return of bath liquor to said lower portion of the separation zone. In some cases, the movement of crystals into the crystal exit portion of the separation zone may be entirely interrupted from time to time during intervals suitably prolonged to give the crystals in the body of the bath additional time in which to grow. In other cases, time for additional growth is given to the crystals in the body of the bath by throttling without cutting off communication between the crystal exit portion of the separation zone and the portion of the bath external thereto. By such throttling action the crystals in the body of the bath are given more time for growth than they would otherwise have.

Another object of the invention is to provide simple and effective means for interrupting or throttling the movement of crystals down into the exit portion of the separation zone. A further object of the invention is to provide improved means, external to the saturator, for treating bath liquor withdrawn from the saturator and for returning the treated bath liquor to the saturator.

The various features of novelty which characterize my invention are pointed out with particularity in the claims annexed to and forming a part of this specification. For a better understanding of the invention, however, its advantages and specific objects attained by its use, reference should be had to the accompanying drawings and descriptive matter in which I have illustrated and described preferred embodiments of the invention.

Of the drawings:

Fig. 1 is a diagrammatic representation or flow sheet of apparatus for producing sulphate of ammonia; and Fig. 2 is a partial, sectional elevation of a portion of the saturator shown in Fig. 1.

The apparatus shown diagrammatically in Fig. 1 comprises a saturator tank A having a conical hopper bottom portion A', an outlet $A^2$ for the gas passing through the saturator, an overflow outlet $A^3$ for bath liquor, an inlet $A^4$ for the return of bath liquor to the tank, and a cylindrical extension $A^5$ coaxial with and open at its upper end to the lower end of the hopper bottom portion of the tank. Said tank extension $A^5$ forms a crystal receiving chamber and is provided at its lower end with an outlet $A^6$ for the outflow of sulphate of ammonia crystals and liquor forming a carrying stream for said crystals.

The outlet $A^6$ is connected to the inlet of a pump D which discharges the bath liquor and entrained crystals withdrawn from the chamber $A^5$ into an elevated feeder tank E. The latter has a bottom outlet E' discharging crystals settling in the bottom of the feeder tank along with a small portion of the bath liquor entering the tank, to one or the other or both of two centrifuges or centrifugal dryers F and FA. Bath liquor separated from the crystals passing into the dryers is discharged through pipe F' into a carrier liquor supply tank G. Bath liquor passes from the bottom of the tank G through a pipe G' to a tangential inlet $A^7$ in the side wall of the chamber $A^5$ and may overflow from the tank G through an overflow outlet $G^2$. The major portion of the bath liquor passed into the feeder tank E passes away from the upper end of the latter through an overflow conduit $E^2$ which discharges into the tank G. As shown, a heater H, which may well be a steam heater, is included in the overflow conduit $E^2$. Such a heater may be used to dissolve fine crystals in the bath liquor held in the return tank G and to insure a suitably high bath temperature.

Bath liquor passing out of the saturator through the overflow outlet $A^3$ passes into a tar separator I of conventional decanter type, from which tar overflowing from the tank may be removed in any customary manner. A seal pot I' in the separator I prevents inflow of air into, or outflow of gas from, the saturator through the overflow outlet $A^3$, under normal pressure condition. Bath liquor is withdrawn from the lower portion of the tar separator by a pump J which has two valved outlet branches J' and $J^2$. As shown, the branch J' includes a heater K from which the liquor heated therein is passed into a main bath liquor return pot L. The latter includes a gas sealing pipe L' closed at its upper end and open at its lower end to the lower portion of the tank L and formed with a lateral outlet connected to the saturator inlet $A^4$ for the return of bath liquor to the saturator.

Bath liquor discharged by the pump J through its discharge branch $J^2$, is passed into a decanting tank M located at a higher level than the receptacle G and return pot L. The receiver M has a bottom outlet M' discharging into the upper end of the return pot L and has an overflow outlet $M^2$ discharging into the receptacle G. Bath liquor carried out of the saturator by the gas passing through the outlet $A^2$ and separated from the gas in the usual "acid catcher," not shown, may be returned to the saturator through the pipe T and decanter M. As shown, valves N' and $N^2$ in the return pipes J' and $J^2$, and a valve $N^3$ in the bottom outlet M' of the receiver M, permit regulation of the relative amounts of bath liquor passed from the tar separator through the heater K and thence directly into return pot L, or directly into the decanter M and regulation of the relative amounts of bath liquor passing to the return pot L and to the receptacle G from the decanter M.

As explained before the object of this invention is the production of relatively large sulphate crystals. This is accomplished by keeping an upflow of bath liquor from the crystal receiving chamber $A^5$ thru the throttled top exit of the receiving chamber $A^5$ to the saturator tank. The exit is throttled by an obturator Q. The upflow of liquor in the throttled exit allows only crystals above a certain size to enter the crystal receiving chamber $A^5$. To create the liquor upflow an excess quantity of liquor has to be returned thru the liquor entrance $A^7$ than is withdrawn from the crystal receiving chamber thru the bottom outlet $A^6$. Liquor containing crystals is pumped by the pump D into the settling tank E. The return liquor from E flows thru pipeline $E^2$ and $F^1$ into the return tank G and from this tank thru pipeline $G^1$ and entrance $A^7$ into the receiving chamber $A^5$. Since crystals are removed from this liquor in the crystal separators F and FA the quantity of the return liquor to chamber $A^5$ is less than the quantity of liquor withdrawn thru the bottom outlet $A^6$.

To cause this quantity to be in excess of the quantity of liquor withdrawn, additional liquor has to be added from a different source to the return tank G. It is important for the purpose of this invention that this additional liquor is freed from crystals in the same way as the return liquor from the settling tank E. This is done by the use of a crystal settling or decanting tank M. Liquor containing crystals is pumped by the pump J thru the pipeline $J^2$ into the decanting tank M. Thru pipeline $J^1$ another stream of the liquor is pumped thru the liquor heater K directly into the liquor return pot L. The amount of liquor flowing to the decanting tank M or to the liquor return pot L is adjusted by the valves $N^1$ and $N^2$. In the decanting tank M the crystals settle to the bottom and are carried by a constant liquor stream thru the bottom outlet $M^1$ and the regulating valve $N^3$ into the liquor return pot L. The crystal containing liquor stream joins in the return pot L the liquor flow heated in the heater K. By this the temperature of the liquor containing crystals is raised and sticking together of the crystals is prevented. It has been proved in operation that the crystals in the return pot remain loose salt crystals and are carried out without difficulties by the vertical pipe $L^1$ thru the opening $A^4$ into the saturator.

The gas carrying the ammonia which is recovered in the saturator, is passed into the latter through a vertically disposed cracker pipe B which extends through the top wall of the saturator and external to the latter, has a gas inlet B'. At its lower end the cracker pipe B is provided with an outwardly flared discharge mouth $B^2$ open at its underside. The make-up acid needed to maintain the desired bath liquor acidity is supplied through the pipe b. As shown, the pipe b extends through the closed upper end of the cracker pipe and is connected at its lower end to an acid distributor in the form of a pipe ring b' coaxial with the saturator and located at a level slightly above the bath liquor level in the saturator.

Advantageously, the bath liquor is continuously recirculated through a path including a central up flow portion, a radial out flow portion in the upper portion of the bath, and a down flow portion alongside the lower conical portion of the saturator wall, generally as shown by the arrows in Fig. 1. This circulation is effected, as shown, by discharging into the bath liquor a gaseous fluid which may be air, coke oven gas, or ammonia from a fixed ammonia still. As shown, the gaseous fluid is supplied through a pipe P extending axially through the cracker pipe and has its lower end connected through branch pipes P to a spray ring P'. The latter has a multiplicity of small distributed discharge orifices $P^2$. Advantageously, and as shown, some of the orifices $P^2$ are arranged to discharge along lines adjacent and upwardly alongside the lower conical portion of the saturator wall. The pipe is also formed with a few orifices $P^3$ discharging into the bath liquor at different levels above the spray ring P'.

The spray pipe P' forms the rim of a valve or obturator Q which has a conical body and may be lowered and raised by the vertical adjustment of the pipe P to close or variably throttle communication between the chamber $A^5$ and the bath space above it. As shown, the upper end wall of the cracker pipe is formed with a central opening and supports a stuffing box $P^4$ through which the pipe P extends. Above said end wall the pipe P is provided with a threaded extension R which as shown is swivel connected to the pipe and is threaded through a nut member S above and supported by the cracker pipe end wall, and has a hand wheel R' secured to its upper end. Compressed air or other gaseous fluid under suitable pressure may be supplied to the pipe P through a flexible pipe $P^5$ connected to the external end of the pipe P.

In the normal operation of the apparatus illustrated, coke oven gas or other ammonia containing gas passes continuously through the cracker pipe B into the saturator A wherein it is brought into scrubbing contact with the bath liquor in the upper portion of the bath. The gas passes away from the bath into the gas space U surrounding the cracker pipe B and above the bath level W, and thence out of the saturator through its gas outlet $A^2$. Make-up acid is supplied through the pipe b and spray ring b', the latter being located in the lower portion of the cracker pipe, as required to maintain the desired acidity, notwithstanding the constant consumption of the acid in its reaction with ammonia in which sulphate of ammonia is formed. In regular operation, much, at least, of the bath liquor is supersaturated, and sulphate of ammonia crystallizes out of the bath liquor at the same average rate at which it is formed by the reaction of the ammonia in the gas with the sulphuric acid in the bath liquor.

Part of the ammonium sulphate crytallizing out of the bath liquor forms minute seed crystals or nuclei, and the remainder adheres to previously formed crystals, or partly to such crystals and partly to exposed portions of the saturator structure. The adherence of crystallized ammonia on previously formed crystals cause the latter to "grow" or increase in size. The crystallized sulphate of ammonia adhering to portions of the saturator structure form objectionable deposits of what is commonly called "rock salt."

The bath liquor circulation and turbulence resulting from the passage of the gas into the bath liquor through the submerged cracker pipe mouthpiece $B^2$, and from the discharge of gaseous fluid supplied through the pipe P, contributes to repeated contacts of previously formed crystals with particles of bath liquor supersaturated with ammonium sulphate, and the resultant deposit on those crystals of ammonium sulphate crystallizing out of the bath liquor. Within wide limits, the size of the ammonium sulphate crystals suspended in the bath liquor continues to increase so long as the bath liquor circulation or turbulence is effective to bring the crystals repeatedly into contact with supersaturated bath liquor.

The valve Q in conjunction with means by which the liquor flow into the chamber $A^5$ through which the inlet port $A^7$ may be kept in excess of the outflow through port $A^6$, makes it practically feasible to regulate the size of sulphate of ammonia crystals passing away from the saturator through the chamber $A^5$ and its outlet $A^6$. With the valve Q in its closed position as shown in full lines in the drawings, the passage of crystals from the body of the bath into the chamber $A^5$ is prevented. In consequence, all of the crystals then in the saturator may continue to grow while in contact with supersaturated sulphate of ammonia.

During any period in which the valve Q is raised from its seat and in which the rate at which bath liquor is returned to the chamber $A^5$ through the port $A^7$ exceeds the rate at which liquor passes away from that chamber to the outlet $A^6$, there will be an upflow of bath liquor up out of the chamber $A^5$ through the port or space between the valve Q and its seat. The upflow away from said port subjects crystals in the path of such flow to a force which may be called a stream force, and which opposes the gravitational force tending to move the crystals through the port. The stream force thus tending to prevent the flow of crystals down past the valve Q, is a function of the velocity of liquor upflow through the port between the valve Q and its seat and may be regulated by varying the extent of valve opening, and by varying the excess of the flow through the port $A^7$ over the flow through the port $A^6$. The ratio of the lifting effect of the stream force to the opposing gravitational force acting on a crystal, diminishes as the size of the crystal increases. By suitable regulation of the stream force, it is thus possible to substantially prevent crystals of less than some desired size from moving past the valve Q into the chamber $A^5$, while permitting larger crystals to move freely into said chamber.

As already indicated, the crystal size regulating effect of the valve Q may result from the adjustment of the valve alternately into open and closed positions at suitable intervals, or may result from the maintenance of the valve in an intermediate, throttling position. In the one case, the discharge of crystals from the saturator is intermittent, and in the other case the discharge of crystals is continuous. In regular operation, however, the production of large crystals is continuous in each case.

In ordinary practice, however, I contemplate the continuous operation of the pump D at normal speed, since the energy required for the operation of the pump is relatively small and there are certain advantages in maintaining a continuous circulation through the feeder tank and chamber $A^4$. With the valve Q tightly closed, the rate at which bath liquor is returned to the chamber $A^5$ through the port $A^7$, cannot exceed the rate at which liquor passes away from the chamber through its outlet port $A^6$. Under such conditions, liquor will overflow from the tank G through its overflow outlet $G^2$ into the return pot L at the same average rate at which liquor is passed into the tank G through the overflow outlet $M^2$ from the decanter M. In operation with the valve Q alternately fully closed and open, it may be desirable whenever the valve Q is adjusted into its closed position of the liquor passing to the feed tank E to adjust one or more of the valves $N'$, $N^2$, and $N^3$ so as to then minimize the overflow from the decanter M into the tank G.

In the practical use of the present invention, the fine crystal content of the carrying stream of liquor moving from the chamber $A^5$ to the feeder tank E, is normally appreciably smaller than the average fine crystal content of the bath liquor in the saturator. The relatively small fine crystal content is advantageous. For one thing, it desirably reduces the duty imposed on the centrifuges F and FA, and, more importantly, it desirably reduces the fine crystal content of the crystal product separated from the bath liquor in the centrifuges. Because of the crystal recovering action of the centrifuges, the small quantity of bath liquor passing from the latter through the conduit $F'$ to the tank G, has a very small fine crystal content. Much of the fine crystal content of the crystal and liquor mixture in the feeder tank E, passes away from the latter through its overflow outlet $E^2$. The fine crystal content in the liquor passing away from the feeder tank E through the pipe $E^2$ may be wholly or largely eliminated by the crystal dissolving action of the heater H. In normal operation, the excess of liquor entering the chamber $A^5$ through the port $A^7$ over the liquor leaving the chamber through the port $A^6$ is supplied to the tank G through the overflow outlet $M^2$ from the decanter M. In consequence of its decanting action, the decanter M passes liquor through its overflow pipe $M^2$ to the tank G which has a much smaller fine crystal content than does the liquor passing into the decanter M through the pipe $J^2$.

While the regulation of the size of the sulphate of ammonia crystals effected by the adjustment of the valve Q is not dependent on the form of the apparatus shown for treating bath liquor withdrawn from the saturator prior to the return of the treated liquor in the saturator, the apparatus shown in Fig. 1 has especial advantages. This is particularly the case when the saturator is operated at the high capacity practically possible with a saturator of the general type and form shown including the cracker pipe mouthpiece $B^2$ which has a wide lip portion inclined at a small angle to the horizontal, and disposed with reference to the saturator bath level in general accordance with the principles disclosed in my prior application, Ser. No. 492,265, filed June 25, 1943. Thus, for example, a saturator shaped and proportioned generally as shown in Fig. 1, and having a maximum internal horizontal diameter of 13 feet may be used to recover the ammonia in coke oven gas supplied to the saturator at the rate of about 4,000,000 cubic feet per hour. In such a saturator, the maximum diameter of the mouthpiece $B^2$ may well be 10 feet, and the lower edge of the mouthpiece lip may well be about 4 inches below the normal or average level of the top surface W of the saturator bath liquor in normal operation, and the volume of the annular gas space may well be only about 500 cubic feet.

In operation under the conditions stated by way of example in the previous paragraph, the average velocity of the gas up flowing from the bath liquor into the annular gas space U surrounding the cracker pipe will be approximately 10 feet per second, and will increase as the gas approaches the outlet $A^2$ owing to the conical shape of the upper portion of said space. In practice, the velocity of most of the gas as it passes upward out of the bath liquor is appreciably higher than 10 feet per second, because of the turbulence of the bath liquor at the top of the bath and the fact that much of the gas passes out of the bath liquor in the form of geyser-like jets which are irregular in size and in distribution. In consequence, a considerable amount of bath liquor is continuously being splashed into the gas space surrounding the cracker pipe and onto the internal surfaces of the walls enclosing said space. The intimate contact of the gas passing through the gas space U with the bath liquor splashed into said space and onto its enclosing walls, contributes to the high efficiency of ammonia recovery, notwithstanding the high capacity rate of operation. The relatively large amount of bath liquor splashing onto the walls of the space U minimizes the deposit of rock salt on those walls which occurs when the amount of liquor splashed onto said walls is not great enough to wash away sulphate crystallizing out of the splashed liquor and drying on the walls as a result of evaporation of more or less of the liquor splashed onto said walls.

The feeding of the make-up acid into the portion of the bath directly beneath the cracker pipe bore insures an acidity in the portion of the bath liquor beneath and in close proximity to the cracker pipe and its mouthpiece which is higher than the average bath acidity. This materially reduces the risk of sulphate of ammonia or "rock salt" deposits on the underside of the cracker pipe mouthpiece. The turbulence of the bath liquor directly beneath the cracker pipe and its mouthpiece, due to the high rate of gas flow into the saturator through the cracker pipe and due in part also, to the agitation created by the gaseous fluid supplied through the pipe P, also tends to minimize the risk of rock salt deposits on the cracker pipe.

As will be apparent, the adjustment of the valve Q to close or sharply throttle communication between the receiving space $A^5$ and bath space above it, prolongs the average period permitted the sulphate of ammonia crystals formed in the bath, and results in increasing the size of those crystals. As previously explained, the bath liquor returned to the bath space through the crystal receiving space offers greater opposition to the settling movement of a crystal out of the bath space into the receiving space, when the crystal is small than when it is large. In practice, the stream force of the bath liquor up flow out of the receiving space $A^5$, substantially prevents crystals below a certain minimum size from entering the receiving space. That minimum crystal size is increased by increasing the velocity of liquor up flow, and may be regulated, therefore, by adjusting the valve Q to vary its throttling effect.

When the up flow from the space $A^5$ is highly throttled, the separation zone in which the up flowing bath liquor screens small crystals out of the path of movement of larger crystals into the receiving space will be substantially entirely within the saturator bath space above the receiving space $A^5$. When communication between the two spaces is not throttled, an appreciable portion of the separation zone may extend down into the receiving space. As explained in my prior application, Ser. No. 525,544, the use of a receiving space of cylindrical form, and the return of bath liquor to that space through a tangential inlet are advantageous, but neither is essential to the use of stream force effect of the returning bath liquor in preventing the withdrawal of unduly small crystals, and neither need be employed for the purpose of the present invention.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. In the production of ammonium sulphate crystals by passing ammonia containing gas into contact with a sulphuric acid bath liquor in a saturator having a crystal receiving space at its lower end opening upwardly into the crystal forming and bath space about it and having an adjustable obturator within and adjacent the lower end of said saturator, said crystal receiving space and said bath space adjacent thereto and said obturator being so constructed as to afford on adjustment of said obturator, a variable space for flow of bath liquor from and to said crystal receiving space, the method which comprises the steps of fixing the extent of space for said flow by adjustment of said obturator, withdrawing bath liquor carrying crystals from said crystal receiving space, flowing bath liquor from an outside source into said crystal receiving space at a rate in excess of the rate at which the crystal bearing liquor is withdrawn therefrom such that the upward movement of liquor induced thereby in said crystal forming and bath liquor space restricts the settling rate of relatively smaller crystals into said crystal receiving space, and re-circulating said small crystals in said bath space.

2. A method as specified in claim 1, in which a gaseous fluid is discharged continuously into the bath liquor in the portion of the bath space immediately above said receiving space to thereby maintain a circulatory movement of the bath liquor.

3. In the production of ammonium sulphate crystals by passing ammonia containing gas into contact with a sulphuric acid bath liquor in a saturator having a crystal receiving space at its lower end opening upwardly into the crystal forming and bath space about it, said crystal receiving space and said bath space adjacent thereto being so constructed that a seat in said opening is afforded for a valve constructed to afford on adjustment into one position a space for flow of bath liquor from and to said crystal receiving space, and on adjustment into a second position to eliminate said space for flow and prevent such flow, the method which comprises the steps of alternately permitting and preventing said flow by adjustment of said valve, withdrawing bath liquor carrying crystals from said receiving space, flowing bath liquor from an outside source into said crystal receiving space at a rate in excess of the rate at which the crystal bearing liquor is withdrawn therefrom such that the upward movement of liquor induced thereby in said crystal forming and bath liquor space restricts the settling rate of relatively smaller crystals into said crystal receiving space, and re-circulating said small crystals in said bath space.

4. In the production of ammonium sulphate crystals by passing ammonia containing gas into contact with a sulphuric acid bath liquor in a saturator having crystal receiving space at its lower end opening upwardly into the crystal forming and bath space about it, and having an overflow outlet for bath liquor at the top of said bath space, and having an adjustable obturator within and adjacent the lower end of said saturator, said crystal receiving space and said bath space adjacent thereto and said obturator being so constructed as to afford, on an adjustment of said obturator, a variable space for flow of bath liquor and crystals to said crystal receiving space, the method which comprises the steps of fixing the extent of space for said flow by adjustment of said obturator, withdrawing bath liquor carrying crystals from said receiving space, flowing bath liquor from an outside source directly into said crystal receiving space at a rate in excess of the rate at which the crystal bearing liquor is withdrawn therefrom such that the upward movement of liquor induced thereby in said crystal forming and bath liquor space restricts the settling rate of relatively smaller crystals into said crystal receiving space and flowing bath liquor from an outside source directly into said bath space and recirculating said small crystals in said bath space.

5. A method as specified in claim 4 in which the bath liquor flowing into said receiving space is bath liquor which has previously passed out of said saturator and which has been treated while outside the saturator to make its fine crystal content smaller than the average fine crystal content of the bath liquor in the saturator.

6. In the production of ammonium sulphate crystals by passing ammonia containing gas into contact with a sulphuric acid bath liquor in a saturator having a crystal receiving space at its lower end opening upwardly into the crystal forming and bath space about it, and having an overflow outlet for bath liquor at the top of said bath space, an adjustable valve within said saturator adjacent its lower end, said crystal receiving space and said bath space adjacent being so constructed that the average horizontal cross section of said bath space is substantially greater than that of said receiving space, the method which comprises the steps of fixing the extent of space for said flow by adjustment of said valve, withdrawing bath liquor carrying crystals from said receiving space, flowing bath liquor withdrawn from said receiving space and overflowing through said outlet in part directly into said bath, and in part directly into said crystal receiving space at a rate in excess of the rate at which the crystal bearing liquor is withdrawn therefrom such that the upward movement of liquor induced thereby in said crystal forming and bath liquor space restricts the settling rate of relatively smaller crystals into said crystal receiving space, recirculating said small crystals in said bath space, and varying the ratio of the rates at which bath liquor is directly returned to said receiving and bath spaces to thereby vary the size of sulphate of ammonia crystals withdrawn from said receiving space.

7. A saturator tank for producing sulphate of ammonia crystals comprising in combination, an overflow outlet for said tank, a crystal receiving chamber below and opening directly into the bottom portion of said tank and of substantially smaller average horizontal cross section than said tank, an outlet in the bottom of said chamber and a side inlet therein, an adjustable valve, said chamber, the bottom of said tank, and said opening being so related and constructed as to afford a seat for said valve, and also an increasing flow space past said valve on upward adjustment thereof, means arranged to withdraw crystals and liquor through said outlet in the bottom of said chamber, means for separating crystals from the bath liquor, means arranged to return said separated liquor and some, at least, of the overflow bath liquor through said inlet into said crystal receiving chamber.

8. A saturator tank as specified in claim 7, in which said valve is attached to the lower end of an uprising tubular valve adjusting member forming a conduit for the passage of a gaseous agitating fluid into the bath liquor in the lower portion of said bath space.

9. Apparatus for the production of ammonium sulphate crystals, comprising, in combination, a saturator tank, a receiving chamber below and opening directly into the bottom portion of said saturator tank, an obturator associated with and adjustable relative to said opening, said chamber, the bottom portion of said tank and said obturator being so related and constructed as to afford a flow passage past said obturator varying in cross section as said obturator is adjusted, an outlet from said chamber, an inlet in the wall of said chamber above said outlet, a crystal separating means, a return tank, conduits leading from said outlet to said crystal separating means, from said crystal separating means to said return tank and from said return tank to said inlet in said chamber, an overflow conduit on said saturator tank, an external flow circuit including said overflow conduit, a tar separator, an overhead receiving and decanting tank and a return pot adjacent said saturator tank and at a lower level than said return tank, and an overflow conduit from said receiving tank to said return tank, whereby crystal-free liquor from said crystal separating means may be returned by way of said return tank to said crystal receiving chamber together with crystal-free liquor cycled through said saturator overflow, tar separator, and receiving and decanting tank so as to retain fine crystals in the saturator above said obturator.

CARL OTTO.

REFERENCES CITED

The following references are of record in the file of this patent:

FOREIGN PATENTS

| Number | Country | Date |
| --- | --- | --- |
| 390,980 | Great Britain | Apr. 20, 1933 |
| 507,351 | Great Britain | June 14, 1939 |